3,484,403
PREPARATION OF POLYAMIDE-CARBOXYLATED POLYOLEFIN MELT BLENDS
Marion O. Brunson and William D. McGillen, Kingsport, Tenn., assignors to Eastman Kodak Company, Rochester, N.Y., a corporation of New Jersey
No Drawing. Filed Mar. 14, 1966, Ser. No. 533,859
Int. Cl. C08f 29/10; C08g 41/04
U.S. Cl. 260—23                                6 Claims

ABSTRACT OF THE DISCLOSURE

Hot melt coating and adhesive blends of polyamides and polyolefins are produced by blending a polyamide with a polyolefin which has been modified by reaction with an unsaturated dicarboxylic acid such as fumaric acid.

---

This invention relates to hot melt plastic materials and, more particularly, to plastic compositions which may be advantageously employed as hot melt coatings and adhesives, coatings which may be embossed with a lenticular pattern for three dimensional pictures, and in transparent packaging operations.

In the search for improved hot melt formulations possessing a high degree of adhesion to substrates, freedom from mechanical difficulties, exhibiting improved optical properties, having a high degree of flexibility and toughness and the like, efforts have been made in the past to blend polyolefins and polyamides so as to obtain a combination of the best qualities of both of these materials. Up to the present invention, these efforts have been fruitless and it has become accepted in the art that, due to the wide differences in the chemical properties of polyolefins and polyamides, these two materials are definitely incompatible. Blends of these two materials are known to be very milky in appearance when hot and produce grainy and brittle films upon cooling, end products from which it has been impractical to produce useable hot melt coatings, adhesives and the like.

According to this invention, however, it has now been found that by modifying polyolefins by grafting them with unsaturated dicarboxylic acids, there is produced a polyolefin product that not only is compatible with polyamides but which, when blended with polyamides, gives greatly improved and highly valuable hot melt compositions. One of the unusual characteristics of these compositions resides in the fact that the modified polyolefin and polyamide are apparently incompatible in the melt state but they become compatible as the melt cools and passes into the solid state.

Polyolefins, in general, may be employed successfully according to the present invention, including normally solid homopolymers and copolymers of alpha monoolefins such as polyethylene, both crystalline and amorphous polypropylene, copolymers such as ethylene-propylene, propylene-polybutene, and the like. Similarly, polyamides having recurring amide units as an integral part of the main polymer chain resulting from the reaction of any diamine and any organic dibasic acid can be employed if the resulting product has a melt viscosity of no more than 150,000 cps. at 190° C.

Although the utility and benefits of the blends of this invention can be demonstrated over an extremely wide range of ratios, it has been found that the preferred ratios are within the range of about 10%–90% by weight modified polyolefin to 90%–10% polyamide.

In practicing this invention, the modified polyolefin is prepared by reaction of the polyolefin with an unsaturated dicarboxylic acid or its anhydride at a temperature above 200° C. and below 400° C., in the absence of oxygen or catalyst, for 15 minutes to 4 hours, the reaction time being dependent upon the temperature. The resulting product is then refined by removal of excess unsaturated dicarboxylic acid, e.g. purging the reaction product with inert gas while the melt temperature is between 200° C. and 300° C., after which it may be handled in the same manner as conventional polyolefin. Exemplary unsaturated dicarboxylic acids are: maleic, fumaric, citraconic, aconitic, itaconic, and also citric or other such acids which decompose at reaction temperature to form unsaturated dicarboxylic acids such as those listed.

In the preferred aspects of the invention, polyethylenes having a density of less than 0.95 and melt viscosity of less than 100,000 cps. at 190° C. are reacted with 0.5 to 5.0% unsaturated dicarboxylic acid or anhydride such as, specifically, maleic anhydride, at a temperature between 240° C. and 320° C. for a period of 15 minutes to one hour. The resultant product, after purging with an inert gas for about one hour at melt temptrature, is then ready for melt blending with the polyamide.

The final modified polyolefin-polyamide blend can be obtained by conventional melt blending procedures such as by the use of hot rolls, heated to a temperature of 150° C. to 205° C., and during this blending step other modifying resins and materials may be added, if desired, which are mutually compatible with both the polyolefin and the polyamide resins. Examples of such materials would include polyterpene resins, hydrocarbon resins, rosin esters, hydrogenated rosins, polybutene, polymerized rosin such as Nuroz 1178–3, wood resin such as Vinsol, chlorinated biphenyls such as Aroclor 1254, chlorinated paraffin such as Chlorinated Wax 70, petroleum waxes such as Wax Ester 60, and the like.

The following examples will illustrate in specific detail how the invention can be practiced and will show many of the advantages of the invention.

EXAMPLE 1

400 grams of Epolene C–10, a low density polyethylene, having a molecular weight of approximately 7000 and a density of about 0.907, was reacted with 20 grams of maleic anhydride. The reaction mixture was melted and then heated at 275° C. for 45 minutes. During the reaction period, nitrogen was added to avoid exhaustion of the maleic anhydride. The mixture was then cooled to 200° C. and purged with nitrogen for one hour.

The resultant product, commercially available as Epolene C–16, was melt-blended in varying ratios with Versalon 1112, a polyamide and believed to be prepared by the reaction of a commercial dimer acid, adipic acid, and ethylene diamine. It was found that all ratios of maleated polyethylene and polyamide were incompatible in the melt but quite compatible when the blend resolidified.

EXAMPLE 2

In order to determine the compatibility or plasticizing effect of the modified polyethylene and the polyamide, tensile and elongation properties were examined on 100% Versalon 1112 and a blend containing 75% Versalon 1112 and 25% Epolene C–16. The following table shows the results.

TABLE I

| Film | Tensile strength | Percent elongation |
|---|---|---|
| Versalon 1112 (100%) | 1,770 | 135 |
| 75% Versalon 1112, 25% Epolene C–16 | 1,410 | 325 |

The decrease in tensile strength and increase in elongation as a result of the Epolene C–16 addition is proof of plasticization, and therefore, compatibility. Films prepared from combinations of Versalon 1112 and Epolene C–10 (the unmaleated counterpart of Epolene C–16) were very brittle and resulted in zero elongation.

EXAMPLE 3

The blends prepared in Example 1 were cast into films and evaluated for haze according to ASTM Method D1003–61. The following table shows the results.

TABLE II

| Percent Epolene C-16 | Percent Versalon 1112 | Haze |
| --- | --- | --- |
| 100 | 0 | 100 |
| 75 | 25 | 94 |
| 50 | 50 | 80 |
| 25 | 75 | 34 |
| 0 | 100 | 10 |

These results are also an indication of compatibility of the Epolene C–16 and polyamide.

EXAMPLE 4

Blends in varying ratios were prepared using Versamid 940, and reported to be a polyamide of a commercial dimer acid and ethylene diamine, with Epolenes C–16, C–10, C–13, and C–15. Epolene C–16 is the maleated polyethylene described in Example 1, whereas Epolenes C–10, C–13, and C–15 are low density polyethylenes by the high pressure polymerization of ethylene and having molecular weights of 7,000, 10,000, and 4,000, respectively. The blends containing Epolenes C–10, C–13, and C–15 were found to give brittle films at concentrations of 3:1, 1:1, and 1:3. Under identical conditions the Epolene C–16 blends gave very flexible films.

EXAMPLE 5

Another series of blends with Epolene C–10 and C–16 were prepared using Sunkem Nylon 526G, which is reported to be a polyamide of adipic acid and hexamethylene diamine. Films prepared from the blends containing Epolene C–16 were very flexible, indicating good compatibility, whereas the blends prepared with Epolene C–10 were very brittle and cheesey, indicating incompatibility.

EXAMPLE 6

A blend containing 50% Epolene C–16 and 50% Sunkem Nylon 526% was prepared and applied to three-dimensional printing in the manner described in Brunson and Huffaker U.S. Patent 3,148,059. The blend produced a good three-dimensional coating material free of mechanical difficulties and exhibiting very good optical properties and good adhesion and flexibility.

EXAMPLE 7

A blend was prepared of 75% Versalon 1112 and 25% Epolene C–16, and used to package small toys while employing the flow-coating or curtain-coating technique (Modern Packaging, May 1965, page 122). In the actual coating operation, the blend exhibited the typical milky appearance of the incompatible melt; however, the finished product rapidly cooled to a transparent, glossy, tough film with excellent adhesion to the printed board substrate.

EXAMPLE 8

A blend was prepared composed of 90% Epolene C–16 and 10% Sunkem Nylon 526G. This blend was coated at a thickness of 1 mil (15 pounds per 3,000 square feet) on 40-pound bleached kraft paper. The coated paper was then checked for heat seal properties to uncoated paper, to nitrocellulose-coated aluminum foil, and to Saran-coated cellophane. In all cases good heat seal bonds were obtained. A similar coated paper based on 100% Epolene C–16 failed to show adhesion to nitrocellulose-coated foil and Saran-coated cellophane. (Saran is a thermoplastic resin made by polymerization of vinylidene chloride by itself or with other unsaturated compounds.)

EXAMPLE 9

Epolene C–16 was also found to be compatible with the following polyamide resins: Versamid 900, 930, and 950, which are thermoplastic polyamide resins which are linear polymers derived from the condensation of a dimeric fatty acid with ethylene diamine; and Versalon 1175, which is believed to be a linear polymer derived from the same dimer acids as the Versamids, except that the Versalons have a much higher molecular weight. Epolene C–10 was found to be incompatible with all these polyamides.

Although, for purposes of illustration, the foregoing examples have been limited to polyethylene as the specific polyolefin, it should be understood tha the invention is not so limited. Thus, to further illustrate the invention specifically, it has been found by actual trial that maleated polypropylene, both amorphous and crystalline, and maleated copolymers of propylene and butene as well as maleated higher polymers and copolymers, may be blended so as to result in a marked degree of compatibility of the specific materials with polyamides.

The utility of the blends of unsaturated dicarboxylic acid-treated polyolefins and polyamides of this invention is wide and varying. Thus, in the area of hot melt adhesives and coatings, these blends produce excellent heat seals to different substrates such as Saran and nitrocellulose-coated bases. They have good grease resistance, imparted by the polyamide primarily, it is believed. In the area of three-dimensional coatings, these blends give improved optical properties, and improved adhesion and abrasion resistance. In transparent packaging, also, there is improved adhesion to the packaging substrate, good optical properties and excellent film toughness at viscosity ranges that can be easily employed in the prior art skin or blister operations or in the newly developed flow-coating or curtain-coating processes.

Although the invention has been described in detail and illustrated by preferred embodiments, it will be understood that many modifications can be made within the spirit and scope of the invention as previously defined and as summarized in the appended claims.

What is claimed is:

1. A process for the production of hot melt coating and adhesive compositions which comprises first reacting at a temperature of between about 200 and 400° C., a polyolefin comprising a normally solid homopolymer or copolymer of alpha monolefins with from about 0.5 to about 5.0% by weight of a substance selected from the group consisting of unsaturated dicarboxylic acids and their anhydrides, and thereafter melt-blending the resultant modified polyolefin with a polyamide having recurring amide units as an integral part of the main polymer chain and having a melt viscosity of not more than 150,000 cps. at 190° C.

2. The process of claim 1, in which the polyolefin is first reacted at a temperature in the range of 200° C.–400° C. for a period of from 15 minutes to 4 hours.

3. The process of claim 1, in which the modified polyolefin and polyamide are blended in the range of 1%–90% by weight of polyamide to 90%–10% by weight of modified polyolefin.

4. The process of claim 1, in which the polyolefin is first reacted at a temperature in the range of 200° C.–400° C. for a period of from 15 minutes to 4 hours and the resultant modified polyolefin is blended with polyamide in the range of 10%–90% by weight of polyamide to 90%–10% by weight of modified polyolefin.

5. The process of claim 1, in which the polyolefin is polyethylene and the substance with which it is first reacted in maleic anhydride.

6. The process of claim 1, in which the polyolefin is polyethylene and the substance with which it is first reacted is maleic anhydride, the reaction being carried out at a temperature in the range of 200° C.–400° C. for a period of from 15 minutes for four hours.

References Cited

UNITED STATES PATENTS

| | | | |
|---|---|---|---|
| 3,236,914 | 2/1966 | Murdock et al. | 260—857 |
| 2,973,344 | 2/1961 | Fasce | 260—78.4 |
| 3,011,993 | 12/1961 | Kapalko et al. | 260—33.6 |
| 3,216,885 | 11/1965 | Schaufelberger | 161—252 |
| 3,250,823 | 5/1966 | Zeitlin | 260—857 |
| 3,262,989 | 7/1966 | Brignac | 260—857 |
| 3,274,289 | 9/1966 | Murdock et al. | 260—857 |
| 3,328,362 | 6/1967 | Roberts et al. | 260—79.3 |
| 3,342,771 | 9/1967 | Cheritat et al. | 260—41 |
| 3,375,300 | 3/1968 | Ropp | 260—857 |

DONALD E. CZAJA, Primary Examiner

R. A. WHITE, Assistant Examiner

U.S. Cl. X.R.

117—155; 156—331; 260—27, 28.5, 857